3,272,807
UNSYMMETRICAL DISUBSTITUTED AMINO-ALKYL HYDRAZINES

John H. Biel and Wallace K. Hoya, Milwaukee, Wis., assignors to Colgate-Palmolive Company, a corporation of Delaware
No Drawing. Filed Aug. 2, 1962, Ser. No. 214,196
14 Claims. (Cl. 260—243)

This invention relates to hydrazine. More particularly, this invention is concerned with novel mono and poly unsymmetrical (disubstituted amino-alkyl) hydrazines.

This application is a continuation-in-part of my copending application Serial No. 679,520, filed August 21, 1957, now abandoned, and of my copending application Serial No. 796,216 filed March 2, 1959 and now abandoned.

According to the present invention there are provided novel compounds of the formulae

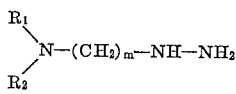

and

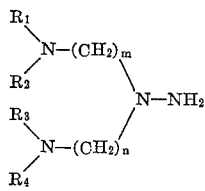

as well as salts and derivatives of these compounds, wherein $R_1$, $R_2$, $R_3$ and $R_4$ represent the same or different substituents of the group consisting of alkyl groups such as methyl, ethyl, propyl, isopropyl, butyl, pentyl, hexyl and the like; alkenyl groups such as the allyl group; aryl groups, particularly where the aryl group is monocyclic such as phenyl, and nuclear-substituted phenyl groups such as hydroxyphenyl, lower alkoxyphenyl, halophenyl and lower acyloxyphenyl groups such as the chlorophenyl, methoxyphenyl and acetoxyphenyl groups; cycloalkyl groups such as cyclopentyl and cyclohexyl; lower alkynyl groups such as the propargyl group; and groups in which $R_1$ and $R_2$, and $R_3$ and $R_4$, are joined together to form secondary amino groups in which the nitrogen is part of a cyclic group, either monocyclic or polycyclic, such as morpholino, pyrrolidino, piperidino, 1,2,3,4-tetrahydroisoquinolino, 1,2,3,4-tetrahydroquinolino, isoindolino, 4-lower alkyl-1-piperazino, 3-hydroxypiperidino and 4-hydroxypiperidino, indolino, theophyllino, and phenothiazino, and the alkylene group between the secondary amino group and the hydrazine moiety has 2-10 carbons, i.e., $m$ and $n$ equal 2 to 10.

Compounds of the above formulae are conveniently produced by reacting a disubstituted amino-alkyl halide with hydrazine. The product produced, however, is dependent on the ratio of reactants employed. For example, by reacting a disubstituted amino-alkyl halide with an excess of hydrazine a mono substituted hydrazine is produced according to the reaction:

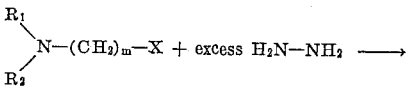

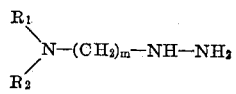

wherein $R_1$, $R_2$ and $m$ have the significance previously assigned, and X is a halogen such as chlorine, bromine or iodine.

By reacting at least two moles of a disubstituted amino-alkyl halide with a mole of hydrazine a disubstituted unsymmetrical hydrazine is formed according to the reaction:

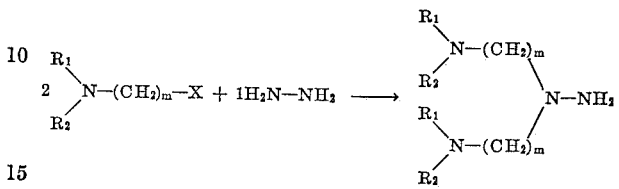

wherein $R_1$, $R_2$, X and $m$ have the significance previously assigned.

If desired, the mono substituted hydrazine may be reacted with a different disubstituted amino-alkyl halide according to the reaction:

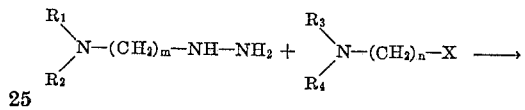

wherein $R_1$, $R_2$, $R_3$, $R_4$, X, $m$ and $n$ have the significance previously assigned.

The described reactions are readily achieved by combining the reactants under liquid reaction conditions and heating the mixture, such as at the reflux temperature, for for 1–5 hours. Excess hydrazine may be used for the reaction medium or a solvent inert under the reaction conditions present, such as benzene, ether, methanol or ethanol may be employed. The desired product is readily recovered from the reaction mixture by conventional methods, and particularly fractional distillation.

Typical of the disubstituted amino-alkyl halides which may be used in these reactions are γ-(1-methyl-4-piperazino)-propyl chloride,
β-dimethylaminoethyl chloride,
β-pyrrolidinoethyl chloride,
β-morpholinoethyl chloride,
β-(N-benzyl)-methylaminoethyl chloride,
β-(N-o-chlorobenzyl)-methylaminoethyl chloride,
β-(3-hydroxy)piperidinoethyl chloride,
β-(1,2,3,4-tetrahydroisoquinolino)ethyl chloride,
β-theophyllinoethyl chloride,
N-allyl methylaminoethyl chloride,
N-propargyl ethylaminopropyl chloride,
N-cyclopentyl methylaminobutyl chloride,
N-cyclohexenyl n-propylaminoethyl chloride,
N-(p-methoxyphenyl)-isopropyl-N-β-phenethyl-
    aminobutyl chloride,
N-o-chlorobenzyl-N-2-phenoxyethylaminoethyl
    chloride,
N,N-dibenzylaminoethyl chloride,
2-[N-(2-chloroethyl)-N-methyl]-aminoethyl benz-
    dioxane chloride,
N-1-naphthyl methyl-N-ethylaminoethyl chloride,
N-2-pyridyl-N-benzylaminoethyl chloride,
N-2-pyridyl-N-p-methoxybenzylaminoethyl chloride,
N-2-biphenyloxyethyl methylaminoethyl chloride,
3-indolylethyl chloride,
3-indolylisopropyl chloride, N-(p-hydroxyphenylisopropyl)-N-methylaminoethyl chloride,
N-(m-methoxyphenylethyl)-N-methylaminoethyl chloride,
N-2-pyrimidyl-N-methylaminopropyl chloride, and the corresponding bromide and iodides thereof.

By reacting these and related starting materials with an excess of hydrazine the following mono disubstituted aminoalkyl hydrazines are produced:

β-dimethylaminoethyl hydrazine,
α-di-isopropylaminobutyl hydrazine,
β-pyrrolidylethyl hydrazine,
β-morpholinoethyl hydrazine,
γ-(1-methyl-4-piperazino)-propyl hydrazine,
β-(N-benzyl)-methylaminoethyl hydrazine,
β-(N-o-chlorobenzyl)-methylaminoethyl hydrazine,
β-(3-hydroxypiperidino)-ethyl hydrazine,
β-(1,2,3,4-tetrahydroisoquinolino)-ethyl hydrazine,
and β-theophyllinoethyl hydrazine,
N-allyl methylaminoethyl hydrazine,
N-propargyl ethylaminopropyl hydrazine,
N-cyclopentyl methylamino butyl hydrazine,
N-cyclohexenyl n-proylaminoethyl hydrazine,
N-(p-methoxyphenyl)-isopropyl-N-β-phenethyl-aminobutyl hydrazine,
N-o-chlorobenzyl-N-2-phenoxyethylaminoethyl hydrazine,
N,N-dibenzylaminoethyl hydrazine,
2-[N-(2-chloroethyl)-N-methyl]-aminoethyl benzdioxane hydrazine,
N-1-naphthylmethyl-N-ethylaminoethyl hydrazine,
N-2-pyridyl-N-benzylaminoethyl hydrazine,
N-2-pyridyl-N-p-methoxybenzylaminoethyl hydrazine,
N-2-biphenyloxyethyl methylaminoethyl hydrazine,
3-indolylethyl hydrazine,
3-indolylisopropyl hydrazine,
N-(p-hydroxyphenyl-isopropyl)-N-methylamino-ethyl hydrazine,
N-(m-methoxyphenylethyl)-N-methylaminoethyl hydrazine,
N-2-pyrimidyl-N-methylaminopropyl hydrazine, and the like.

The N,N-di(disubstituted amino-akyl) hydrazines may be similarly produced by employing at least two moles of the same disubstituted amino-alkyl halide per mole of hydrazine as illustrated above.

Some of the N,N-disubstituted hydrazines so produced are

N,N-bis(β-dimethylaminoethyl)-hydrazine,
N,N-bis(β-pyrrolidinoethyl)-hydrazine,
N,N-bis(β-diethylaminoethyl)-hydrazine,
N,N-bis-(γ-morpholinopropyl)-hydrazine,
N-(β-dimethylaminoethyl)-N-(morpholinoethyl)-hydrazine,
N-(N',N'-bis-phenylethylaminoethyl)-N-(β-piperidinoethyl)-hydrazine,
N,N-bis-[N-allyl methylaminoethyl]hydrazine,
N,N-bis-[N propargyl ethylaminopropyl]hydrazine,
N,N-bis-[N-cyclopentyl methylaminobutyl]hydrazine,
N,N-bis-[N-cyclohexenyl n-propylaminoethyl]hydrazine,
N,N-bis-[N-(p-methoxyphenyl)-isopropyl-N-β-phenethylaminobutyl]hydrazine,
N,N-bis-[N-o-chlorobenzyl-N-2-phenoxyethylaminoethyl]hydrazine,
N,N-bis-[N,N-dibenzylaminoethyl]hydrazine,
N,N-bis-[2-[N-(2-chloroethyl)-N-methyl]-aminoethyl benzdioxane] hydrazine,
N,N-bis-[N-1-naphthylmethyl-N-ethylaminoethyl] hydrazine,
N,N-bis-[N-2-pyridyl-N-benzylaminoethyl]hydrazine,
N,N-bis-[N-2-pyridyl-N-p-methoxybenzylaminoethyl]hydrazine,
N,N-bis-[N-2-biphenyloxyethyl methylaminoethyl] hydrazine,
N,N-bis-[3-indolylethyl]hydrazine,
N,N-bis-[3-indolylisopropyl]hydrazine,
N,N-bis-[(p-hydroxyphenylisopropyl)-N-methyl-aminoethyl]hydrazine,
N,N-bis-[N-(m-methoxyphenylethyl)-N-methyl-aminoethyl]hydrazine,
N,N-bis-[N-2-pyrimidyl-N-methylaminopropyl] hydrazine and the like.

Alternatively, these and similar mono disubstituted amino-alkyl hydrazines may be reacted with a different disubstituted amino-alkyl halide to form an N,N-bis(disubstituted amino alkyl)-hydrazine in which the disubstituted amino alkyl groups differ from each other.

According to a further embodiment of the invention, derivatives of the poly unsymmetrical disubstituted amino-alkyl hydrazines can be readily produced by reacting the same with a disubstituted amino aldehyde to form an intermediate hydrazone which may be reduced subsequently to a hydrazine. This reaction may be represented as follows:

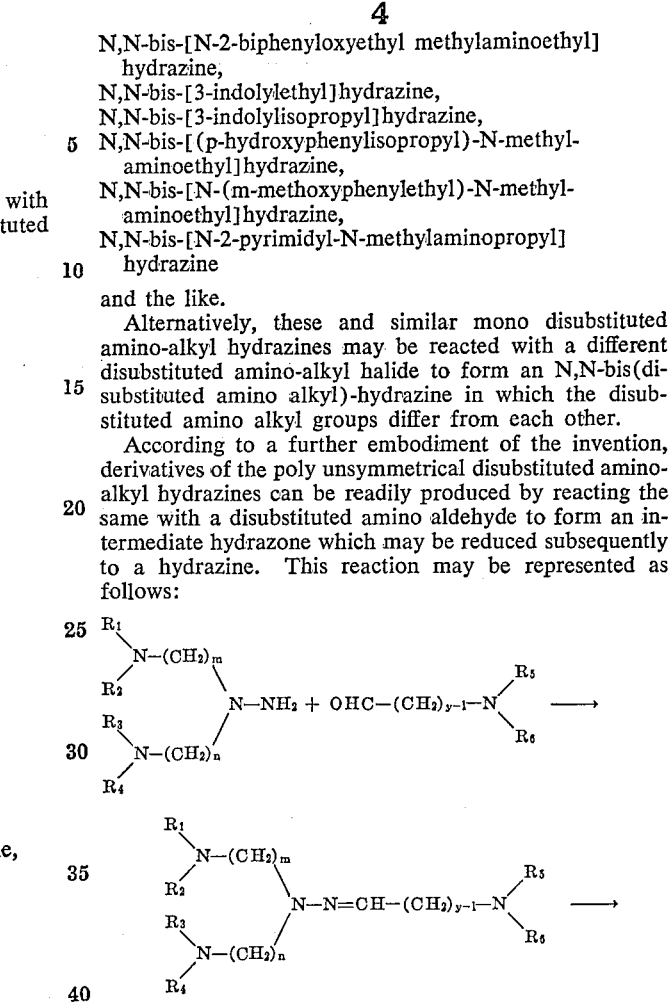

wherein $R_1$, $R_2$, $R_3$, $R_4$, $m$ and $n$ have the significance previously assigned, $R_5$ and $R_6$ represent groups the same or different than those represented by $R_1$ and $R_2$, or $R_3$ and $R_4$, and $y$ is an integer from 2 through 10.

The unsymmetrical hydrazine and aldehyde may be conveniently reacted in the presence of a suitable reaction medium such as benzene, ether, chloroform, water, methanol and ethanol. The reaction may be effected at room temperature although slightly elevated temperatures up to about 50° C. reduce the reaction time to 1–3 hours. The resulting hydrazone may be recovered from the reaction mixture by conventional methods such as extraction with an immiscible solvent or evaporation of the mixture to dryness.

The aldehydes which may be used in this process are essentially identical to the disubstituted amino-alkyl halides listed previously with the halide replaced by an aldehyde group.

The hydrazones may be reduced catalytically or chemically to the corresponding hydrazines. Chemical hydrogenation with a hydride such as lithium aluminum hydride is preferred and may be effected in a dry inert organic solvent such as tetrahydrofuran, ether or chloroform at an elevated temperature such as the reflux temperature. After reduction is completed the hydrazine may be recovered by adding aqueous alkali to the reaction mixture, separating the organic layer and distilling off the solvent.

Catalytic hydrogenation may be effected with nickel, platinum, palladium and oxides thereof as catalysts at ordinary or elevated pressures. A weakly acidic aqueous medium may be used for reducing the hydrazones catalytically.

In yet another embodiment of the invention, by reacting a disubstituted amino aldehyde with an excess of hydrazine the corresponding hydrazone is formed which may be subsequently reduced to the desired unsymmetrical mono(disubstituted amino alkyl)-hydrazine. This process may be represented as follows:

$$\begin{array}{c}R_1\\ \diagdown\\ N-(CH_2)_{m-1}-CHO + \text{excess } H_2N-NH_2 \longrightarrow\\ \diagup\\ R_2\end{array}$$

$$\begin{array}{c}R_1\\ \diagdown\\ N-(CH_2)_{m-1}-CH=N-NH_2 \xrightarrow{H_2}\\ \diagup\\ R_2\end{array}$$

$$\begin{array}{c}R_1\\ \diagdown\\ N-(CH_2)_m-CH_2-NH-NH_2\\ \diagup\\ R_2\end{array}$$

wherein $R_1$, $R_2$ and $m$ have the significance previously assigned. An excess of hydrazine must be employed for otherwise symmetrically substituted bis-(amino-alkyl)-hydrazines will result as shown in copending application, Serial No. 488,427, filed February, 15, 1955, now United States Patent 2,830,050 issued April 8, 1958. Process conditions and reactants as previously described may be used in this process.

Quaternary salts may be readily produced by combining any one of the described unsymmetrical poly-(disubstituted amino alkyl)-hydrazines with a suitable alkylating agent such as an alkyl or aralkyl ester of an acid and particularly dimethyl sulfate, methyl chloride, ethyl bromide, methyl iodide, o-chlorobenzyl bromide, phenylethyl chloride and phenylpropyl bromide. In addition, any of the disubstituted amino-alkyl halides used as reactants may be used to form quaternary salts such as according to the formula $$\begin{array}{c}R_1\\ \diagdown\\ N-(CH_2)_m\\ \diagup\\ R_2\\ \qquad\qquad\diagdown\\ \qquad\qquad N-NH-(CH_2)_y-N\begin{array}{c}R_5\\ \diagup\\ \diagdown\\ R_6\end{array} + N\begin{array}{c}R_7\\ \diagup\\ \diagdown\\ R_8\end{array}-(CH_2)_z-X \longrightarrow\\ \qquad\qquad\diagup\\ R_3\\ \diagdown\\ N-(CH_2)_n\\ \diagup\\ R_4\end{array}$$

$$\left[\begin{array}{c}R_1\\ \diagdown\\ N-(CH_2)_m-\\ \diagup\\ R_2\\ \\ R_7\qquad\qquad\qquad R_5\\ \diagdown\qquad\qquad\qquad\diagup\\ N-(CH_2)_z-N-NH-(CH_2)_y-N\\ \diagup\qquad\qquad\qquad\diagdown\\ R_8\qquad\qquad\qquad R_6\\ \\ R_3\\ \diagdown\\ N-(CH_2)_n-\\ \diagup\\ R_4\end{array}\right]^+ X^-$$

wherein $R_1$, $R_2$, $R_3$, $R_4$, $R_5$, $R_6$, $m$, $n$, $y$, and X have the significance previously assigned, $z$ is an integer from 2 through 10 and $R_7$ and $R_8$ represent the same or different groups represented by $R_1$ and $R_2$.

Acid addition salts of the novel hydrazines are produced by contacting one mole of the hydrazine with one, two or three moles of a mineral or organic acid depending on the number of basic groups present. Acids such as hydrochloric, formic, maleic, fumaric and citric may be used to form salts of the hydrazines.

These compounds as nontoxic onium salts are useful ganglionic blocking agents, hypotensive or blood pressure lowering agents and skeletal muscle relaxants. As nontoxic acid salts they have diuretic properties in animals. The compounds may be formulated for such uses with a pharmaceutical carrier and made into powders, capsules, tablets and drops. Carriers such as water, sucrose, starch and talc can be employed with suitable lubricants such as sodium stearate and binders such as gelatin for making tablets. The oral route of administration is preferred.

The following examples are added to illustrate the preparation of representative compounds provided by the invention but it is to be understood that the invention shall not thereby be restricted.

EXAMPLE 1

β-Dimethylaminoethyl hydrazine

To 294 g. (5.0 moles) of 55% aqueous hydrazine was added 90 g. (0.84 mole) of β-dimethylaminoethyl chloride. The solution was refluxed for one hour, saturated with sodium hydroxide and the product isolated by extraction of the alkaline mixture with tetrahydrofuran. The combined extracts were dried with potassium carbonate and the product collected by distillation, B.P. 57–59° C. (7.3 mm.), yield 48.6 g. (56%), $N_D^{25}$ 1.4541.

EXAMPLE 2

β-Dimethylaminoethyl hydrazine dimaleate

To 23.2 g. (0.2 mole) of maleic acid dissolved in 100 cc. ethanol was added 10.3 g. (0.10 mole) of β-dimethylaminoethyl hydrazine in 100 cc. of anhydrous ether. The solid was collected by filtration, yield 32 g. (96%), M.P. 129° C.

EXAMPLE 3

γ-Dimethylaminopropyl hydrazine

A mixture containing 83 g. (0.68 mole) of γ-dimethylaminopropyl chloride and 205 g. of 85% hydrazine hydrate was slowly heated to 70° C., when an exothermic reaction took place. After the vigorous reaction had subsided, the mixture was refluxed for 1.5 hours. The product was isolated as described in Example 1; B.P. 74° C. (2.0 mm.); $N_D^{20}$ 1.4549; yield 54 g. (68%).

The *dimaleate salt* was prepared as in Example 2, M.P. 115–116° C.

*Analysis.*—Calcd. for $C_{14}H_{25}N_3O_8$: N, 7.71; N.E. 63.87. Found: N, 7.57; N.E. 62.98.

EXAMPLE 4

β-Pyrrolidinoethyl hydrazine

To 370 g. (6.3 moles) of 55% aqueous hydrazine was added 168 g. (1.25 moles) of β-pyrrolidinoethyl chloride. The mixture was refluxed for three hours and worked up as in Example 1. The product was collected by fractional distillation at 54–57° C. (0.10 mm.), yield 110 g. (68%). A higher boiling residue remained which is described in Example 5.

EXAMPLE 5

N,N-bis-(β-pyrrolidinoethyl)-hydrazine $$\left[\begin{array}{c}\diagdown\\ N-C_2H_4\\ \diagup\end{array}\right]_2 -N-NH_2$$

The fractional distillation of the residual liquid in Example 4 yielded a second product which was identified as having the above structure; B.P. 115–118° C. (0.10 mm.), yield 18.5 g. (13%); $N_D^{25}$ 1.4969.

*Anal.*—Calcd. for $C_{12}H_{26}N_4$: N, 12.38. Found: N, 12.42.

The *trimaleate salt* melted at 129–130° C.

*Anal.*—Calcd. for $C_{24}H_{33}N_4O_{12}$: N, 7.32; found: N, 7.19. Neutral equivalent: 95.76, found: 94.91.

EXAMPLE 6

β-Pyrrolidinoethylidenyl hydrazine $$\begin{array}{c}\diagdown\\ N-CH_2CH=N-NH_2\\ \diagup\end{array}$$

To 500 cc. of conc. aqueous hydrochloric acid at 5° C. was added 189 g. (1.0 M) of pyrrolidinoacetal. The solution was allowed to stand at room temperature overnight. Excess hydrochloric acid was distilled off, the residue dissolved in 1 liter of water and the aqueous solution neutralized with 20% sodium hydroxide solution to pH 7. This solution was added to 188 g. (5.0 moles) of hydrazine hydrate (85%) at 5° C. and allowed to stand for 16 hours a 25° C. The solution was saturated with sodium hydroxide and extracted with tetrahydrofuran. The combined extracts were dried with potassium carbonate and the product collected by distillation, B.P. 67–69° C. (0.3 mm.); yield 105 g. (82%).

*Anal.*—Calcd. for $C_6H_{13}N_3$: N, 11.01. Found: N, 11.09.

EXAMPLE 7

*β-Pyrrolidinoethyl hydrazine*

To 30.5 g. (0.80 M) of lithium aluminum hydride in 500 cc. of tetrahydrofuran was added 102 g. (0.80 M) of β-pyrrolidino ethylidenyl hydrazine (Example 6) in 150 cc. of tetrahydrofuran. The mixture was refluxed for 4 hours and the complex decomposed with 40% aqueous potassium hydroxide solution. The organic layer was decanted, dried with $K_2CO_3$ and the product collected by distillation; B.P. 64–67° C. (0.3 mm.), yield 63.6 g. (61%).

*Anal.*—Calcd. for $C_6H_{15}N_3$: N, 21.68. Found: N, 21.88.

The *dimaleate salts* obtained from the bases prepared in Examples 4 and 7 melted at 117–118° C. and a mixed M.P. of the two salts showed no depression.

EXAMPLE 8

*N,N-bis-(β-dimethylaminoethyl)-hydrazine*

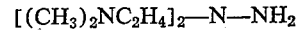

This compound was obtained in 8% yield as the higher boiling fraction by the procedure described in Example 1; B.P. 111–116° C. (10 mm.); $N_D^{20}$ 1.4702.

*Anal.*—Calcd. for $C_8H_{22}N_4$: N (titratable), 16.07. Found: N, 15.97.

The *trimaleate salt* melted at 136–138° C.

*Anal.*—Calcd. for $C_{20}H_{34}N_4O_{12}$: N, 5.36; found: N, 5.11. Percent maleic acid: 66.62; found: 64.75.

EXAMPLE 9

The following compounds have also been prepared by the described procedures.

MONO-(β-N,N-DISUBSTITUTED AMINO-ETHYL)HYDRAZINES
$AmCH_2CH_2NHNH_2$

| | Compound Am | B.P.° C./mm. | Percent Yield | $N_D^{25}$ | Formula | Assays Nitrogen Calcd. | Found |
|---|---|---|---|---|---|---|---|
| 1 | pyrrolidinyl | 64–67/0.3 | 61.4 | 1.4930 | $C_6H_{15}N_3$ | 21.68 | 21.88 |
| 2 | morpholinyl | 72–75/0.015 | 65.0 | 1.4947 | $C_6H_{15}N_3O$ | 19.28 | 13.65 |
| 3 | N-methylbenzylamino | 101/0.05 | 63.0 | [1] 1.543 | $C_{10}H_{17}N_3$ | 15.73 | 15.91 |
| 4 | 4-methylpiperazinyl | 74–75/015 | 42.8 | 1.4916 | $C_7H_{18}N_4$ | 17.70 | 14.89 |
| 5 | 4-hydroxypiperidinyl | 98–100/0.35 | 21.2 | 1.5034 | $C_7H_{17}N_3O$ | 17.6 | 17.5 |
| 6 | tetrahydroisoquinolinyl | 110–116/0.08 | 52.4 | [1] 1.5594 | $C_{11}H_{17}N_3$ | 14.65 | 14.22 |
| 7 | 2-chloro-N-methylbenzylamino | 83–87/0.015 | 28.0 | 1.5394 | $C_{10}H_{16}N_3Cl$ | 6.55 | 6.39 |
| 8 | theophyllinyl | | | | $C_9H_{14}N_6O_2$ | 5.88 | 4.90 |

[1] 20°.

*Maleate salts* of these compounds were prepared and analyzed as follows:

| Compound | Yield | M.P.°C. | Formula | Nitrogen | | Assays Neutral Equivalents | |
|---|---|---|---|---|---|---|---|
| | | | | Calcd. | Found | Calcd. | Found |
| 1 | 75.3 | 109–110 | $C_{14}H_{23}N_3O_8$ | 7.74 | 7.70 | 90.33 | 91.12 |
| 2 | 66.2 | 101–103 | $C_{15}H_{23}N_3O_9$ | 7.42 | 7.13 | 94.34 | 97.00 |
| 3 | | 124–125 | $C_{18}H_{25}N_3O_8$ | 6.81 | 6.83 | [1] 56.42 | 57.91 |
| 4 | 33.2 | 143–144 | $C_{19}H_{30}N_4O_{12}$ | 8.29 | 8.53 | 84.40 | 85.23 |
| 5 | 73.3 | 127–128 | $C_{15}H_{25}N_3O_9$ | 7.16 | 7.47 | 97.84 | 93.51 |
| 6 | 94.2 | 148–149 | $C_{19}H_{25}N_3O_8$ | 6.62 | 6.77 | [1] 54.83 | 56.18 |
| 7 | 50.3 | 121–122 | $C_{18}H_{24}N_3ClO_8$ | 6.28 | 6.33 | 111.46 | 107.48 |
| 8 | | 212 | HCl Salt $C_9H_{15}N_6O_2Cl$ | 20.4 | 18.2 | [2] 12.9 | [3] 12.3 |

[1] Percent Maleic Acid.
[2] Percent Cl Calcd.
[3] Percent Cl Found.

Various changes and modifications of the invention can be made and, to the extent that such variations incorporate the spirit of this invention, they are intended to be included within the scope of the appended claims.

What is claimed is:

1. A member of the group of compounds consisting of compounds of the formulae

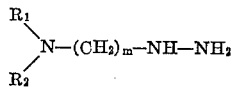

and

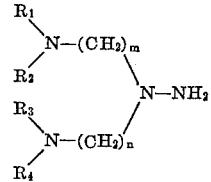

nontoxic pharmaceutically acceptable acid addition salts and nontoxic pharmaceutically acceptable quaternary ammonium salts of the group consisting of lower alkyl halides, phenyl-lower alkyl halides and lower alkyl sulfates thereof, wherein $m$ and $n$ are integers from 2 to 10, $R_1$ and $R_2$ are joined together to form a secondary amino group of the group consisting of morpholino, pyrrolidino, piperidino, 1,2,3,4-tetrahydroisoquinolino, 1,2,3,4-tetrahydroquinolino 4-lower alkyl piperazino, 3-hydroxypiperidino, 4-hydroxypiperidino and theophyllino, and $R_3$ and $R_4$ represent members of the group consisting of lower alkyl groups and the secondary amino groups represented by $R_1$ and $R_2$.

2. Beta-pyrrolidinoethyl hydrazine.
3. N,N-bis-(beta-pyrrolidinoethyl)-hydrazine.
4. N,N-bis-(betadimethylaminoethyl)-hydrazine.
5. Beta-(4-methylpiperazino) ethyl hydrazine.
6. Beta-(3-hydroxypiperidino) ethyl hydrazine.
7. Beta - (1,2,3,4 - tetrahydroisoquinolino) ethyl hydrazine.
8. Beta-theophyllinoethyl hydrazine.
9. Morpholino-lower alkyl-hydrazine.
10. 4-lower alkyl-piperazino-lower alkyl-hydrazine.
11. 3-hydroxypiperidino-lower alkyl-hydrazine.
12. Pyrrolidino-lower alkyl-hydrazine.
13. A compound of the formula

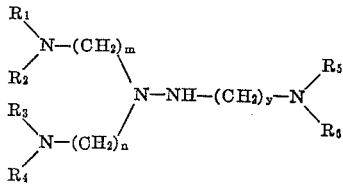

wherein $m$, $n$ and $y$ are integers from 2 to 10, and $R_1$ and $R_2$ are members of the group consisting of lower alkyl, phenyl, lower alkenyl, lower alkynyl, cyclopentyl and cyclohexyl groups and groups in which $R_1$ and $R_2$ are joined together to form a secondary amino group of the group consisting of morpholino, pyrrolidino, piperidino, 1,2,3,4-tetrahydroisoquinolino, 1.2,3,4-tetrahydroquinolino, isoindolino, 4-lower alkyl-1-piperazino, 3-hydroxypiperidino, 4-hydroxypiperidino, indolino, theophyllino and phenothiazino groups, $R_3$ and $R_4$ are members of the group consisting of lower alkyl, phenyl, phenyl-lower alkyl, lower alkenyl, lower alkynyl, cyclopentyl and cyclohexyl groups and groups in which $R_3$ and $R_4$ are joined together to form a secondary amino group of the group consisting of morpholino, pyrrolidino, piperidino, 1,2,3,4-tetrahydroisoquinolino, 1,2,3,4-tetrahydroquinolino, isoindolino, 4-lower alkyl-1-piperazino, 3-hydroxypiperidino, 4-hydroxypiperidino, indolino, theophyllino and phenothiazino groups, and $R_5$ and $R_6$ are members of the group consisting of lower alkyl, phenyl, lower alkenyl, phenyl-lower alkyl, lower alkynyl, cyclopentyl and cyclohexyl groups and groups in which $R_5$ and $R_6$ are joined together to form a secondary amino group of the group consisting of morpholino, pyrrolidino, piperidino, 1,2,3,4-tetrahydroisoquinolino, 1,2,3,4-tetrahydroquinolino, isoindolino, 4-lower alkyl-1-piperazino, 3-hydroxypiperidino, 4-hydroxypiperidino, indolino, theophyllino and phenothiazino groups.

14. A compound selected from the group consisting of N-morpholine-beta-ethyl hydrazine, and its non-toxic pharmaceutically acceptable acid addition salts.

References Cited by the Examiner
UNITED STATES PATENTS
3,051,707  8/1962  Biel _____ 260—247.5
3,086,975  8/1963  Halpern _____ 260—247.5

ALEX MAZEL, *Primary Examiner.*

NICHOLAS S. RIZZO, WALTER A. MODANCE, HENRY R. JILES, *Examiners.*

ROBERT L. PRICE, JOSE TOVAR,
*Assistant Examiners.*

UNITED STATES PATENT OFFICE
CERTIFICATE OF CORRECTION

Patent No. 3,272,807                  September 13, 1966

John H. Biel et al.

It is hereby certified that error appears in the above numbered patent requiring correction and that the said Letters Patent should read as corrected below.

Column 2, line 38, strike out "for"; column 3, line 24, for "n-proylaminoethyl" read -- n-propylaminoethyl --; line 30, for "aminoethyl" read -- aminomethyl --; line 44, for "amino-akyl" read -- amino-alkyl --; column 5, line 35, for "cholride" read -- chloride --; columns 7 and 8, in the table, first column, the last formula should appear as shown below instead of as in the patent:

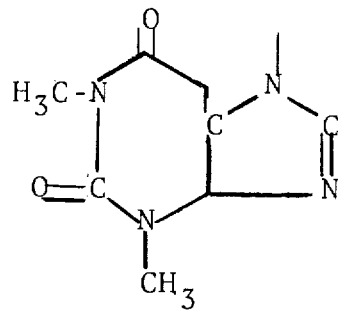

Signed and sealed this 29th day of August 1967.

(SEAL)
Attest:

ERNEST W. SWIDER                      EDWARD J. BRENNER
Attesting Officer                 Commissioner of Patents